United States Patent
Galbraikh et al.

(10) Patent No.: US 6,541,068 B1
(45) Date of Patent: Apr. 1, 2003

(54) METHOD FOR THE FLAME-RETARDANT PROCESSING OF TEXTILE MATERIALS

(75) Inventors: Leonid Semenovich Galbraikh, Moscow (RU); Nina Sergeevna Zubkova, Moscow (RU); Nataliya Grigorievna Butylkina, Moscow (RU); Alexandr Alexandrovich Berlin, Moscow (RU); Nikolai Alexandrovich Khalturinsky, Moscow (RU)

(73) Assignee: Isle Firestop Limited (GB)

( * ) Notice: Subject to any disclaimer, the term of this patent is extended or adjusted under 35 U.S.C. 154(b) by 0 days.

(21) Appl. No.: 09/601,395

(22) PCT Filed: Feb. 13, 1998

(86) PCT No.: PCT/RU98/00031

§ 371 (c)(1),
(2), (4) Date: Sep. 12, 2000

(87) PCT Pub. No.: WO99/41446

PCT Pub. Date: Aug. 19, 1999

(51) Int. Cl.$^7$ ................. D06M 13/364; D06M 13/432; D06M 13/447
(52) U.S. Cl. ................ 427/393.3; 106/18.15; 252/8.61; 252/608; 427/419.8
(58) Field of Search ................ 106/18.15; 252/8.61; 252/608; 427/393.3, 419.8

(56) References Cited

U.S. PATENT DOCUMENTS

| | | | | |
|---|---|---|---|---|
| 3,632,297 A | * | 1/1972 | Sello | 427/393.3 |
| 3,874,912 A | * | 4/1975 | Swidler et al. | 106/18.14 |
| 3,878,245 A | * | 4/1975 | Nachbur et al. | 252/608 |
| 3,894,122 A | * | 7/1975 | Dursch et al. | 106/18.14 |
| 3,897,584 A | * | 7/1975 | Swidler et al. | 106/18.18 |

FOREIGN PATENT DOCUMENTS

| | | | |
|---|---|---|---|
| FR | 2707308 | * | 1/1995 |
| GB | 1431328 | * | 4/1976 |

OTHER PUBLICATIONS

Derwent Abstract No. 1979–62842B, abstract of Soviet Union Patent Specification No. 632702 (Nov. 1978).*
Derwent Abstract No. 1989–184519, abstract of Soviet Union Patent Specification No. 1427017 (Sep. 1988).*

* cited by examiner

*Primary Examiner*—Anthony J. Green
(74) *Attorney, Agent, or Firm*—James E. Pittenger, P.C.

(57) ABSTRACT

A process is proposed for the fireproofing treatment of textile materials by impregnating them initially with a melamine-formaldehyde resin or organosilicon substances, and then with a solution of a complex compound of the ammonia salt of amidoalkylphosphonic acid with ammonium chloride. Materials treated in accordance with the invention have reduced combustibility and low toxicity of the gases given off during combustion.

25 Claims, No Drawings

METHOD FOR THE FLAME-RETARDANT PROCESSING OF TEXTILE MATERIALS

FIELD OF TECHNOLOGY

The invention relates to a technology for producing polymer materials, including textiles, with reduced combustibility, low toxicity of the gases given off during combustion and low smoke-forming capability.

Chemical fibres and textile materials are used in various industries, including for making composition materials used in road transport and in aircraft and ship building. Woven and knitted fabrics are used as decorative finishing materials in places where people are present in large numbers (theatres, clubs, hospitals, museums and hotels), in the building industry and in transport.

Textile materials are widely used in everyday life and for making special clothing for workers in practically every industry.

At the same time, the easy flammability and combustibility of most industrially produced chemical fibres and textile materials constitute a significant problem. They have a low spontaneous combustion temperature and a high burning rate.

PRIOR ART

A method of fire protection impregnation based on the use of orthophosphoric acid and compounds containing nitrogen (dicyanodiamide, carbamide, melamine, guanidine etc.) is widely used on an industrial scale in Russia. In this method, the fabric is treated with a composition including phosphoric acid and one of the listed nitrogen-containing compounds and is subjected to heat treatment (Ye. A. Blekhman, The Manufacture of Incombustible Cotton Fabrics, Moscow, 1950–189 pp.). This process has considerable faults, namely a marked reduction in the resistance of the fabric to tearing load (a reduction in tearing strength of 40–50%) and low efficiency of the fire resistance effect for fabrics composed of a mixture of synthetic and cellulose fibres.

There is a known fire protection composition (GB application 2273720) for the treatment of fabrics, non-woven materials and carpet products, consisting of an aqueous solution of inorganic salts (ammonium phosphate, ammonium sulphate, ammonium bromide and mixtures of these in quantity 12–20% of the composition) and mineral acid (sulfuric acid—0.4–0.6 wt. % of the composition), which assists the solution in penetrating into the fibres of the material and which raises the stability of the bonding of the combustion retarder with the fibres of the textile material. A fault of this composition is the low efficiency of the fire protection effect for materials containing synthetic fibres.

The compositions FR Cros 282, 330 and 334, based on ammonium polyphosphates (Catalogue of Combustion Retarders, Bolid GmbH, Frankfurt, 1996), are used for the fire protection of textiles. The composition FR Cros 282 includes modified mono ammonium phosphate with 10% ammonium polyphosphate in combination with melamine and pentaerythritol in the ratio 3:1:1. The concentration of this composition in the aqueous suspension used for the treatment of textiles is 500 g/liter.

The composition FR Cros 330 is an aqueous vinyl acetate suspension with ammonium polyphosphate, in which the content of the solid matter is 50%. The composition FR Cros 334 includes modified ammonium pyrophosphate. It is used for the fire protection of wood, paper and textiles. For all these compositions, the fire protection effect is achieved with the introduction of combustion retarders into the material in quantity 30–40%, which leads to a reduction in the physico-mechanical indicators and feel properties of the fabrics.

There is a known fire protection process for cellulose materials, based on the use of tetra-(hydroxymethyl)-phosphonium chloride (THPC) and polyfunctional compounds containing nitrogen, which has been given the name "Proban" (U.S. Pat. No. 2,912,466). To make cellulose materials fire-resistant by this process, a polycondensation process is first carried out between THPC and carbamide at a molar ratio of the components of 1:1. The cellulose material is impregnated with an aqueous solution of the precondensate and dried.

The formation of a polymer insoluble in water and organic solvents is achieved by treating the material with ammonia solution or gaseous ammonia at 140–160° C. This treatment is called "Probanfinish-210". The problems with this method include a reduction in the strength of the fabric by 30% and an increase in the stiffness of the material. There are also data indicating high toxicity of the combustion products from cellulose materials containing THPC. When thermolysis of the fire-protected cellulose takes place in the 200–300° C. range, the emission of phosphatin is observed (Spect. Chem., 1984, V. 4, pp. 17–20).

The most effective treatment for cellulose fabrics and for fabrics made of a mixture of cellulose and synthetic fibres is one called "Pyrovatex-CP" (Technico-economic Information Bulletin on Light Industry, 1975, No. 9, pp. 75–76). The fabric is impregnated with an aqueous solution containing N-hydroxymethyldi-(methoxy)-phosphonopropionamide, carbamide, a cross-linking agent and a catalyst. It is then dried, heat-stabilised at a temperature of 140–160° C. and washed. When cotton fabrics are treated by the "Pyrovatex-CP" method, the fire-resistant properties are achieved at a content of 2.0% of phosphorus in the material.

The toxicity of the pyrolysis products of the materials is a significant problem for fabrics protected against fire by the use of N-hydroxymethyldi-(methoxy)-phosphonopropionamide. It has been shown (Textilveredelung, 1970, V. 6, pp. 486–497) that at a temperature of 300–400° C., considerable quantities of methanol are emitted. The relationship revealed rules out the use of fabrics fire-protected in this way for making special clothing for workers and also for the fireproofing of materials used in enclosed spaces.

A study of the comparative effectiveness of the phosphorus-containing preparations "Proban" and "Pyrovatex-CP" has shown that their effectiveness is different for cotton fabrics and fabrics made of a mixture of cotton and polyester fibres.

In all the studied variants of the treatment of fabrics made of a mixture of fibres by the "Pyrovatex-CP" method, the materials had higher fire protection indicators. However, in both cases, fire-protected fabrics can only be produced if they contain not more than 10% of synthetic fibre (Text. Res. J., V. 45, No. 8, p. 586).

The main problem with the known "Proban" and "Pyrovatex-CP" processes is their low effectiveness for materials made of a mixture of cellulose and synthetic fibres and pure synthetic fibres.

UK Patent 2205868 for the fire protection treatment of fabrics based on cellulose with other fibres proposes carrying out the "Proban" method treatment at least twice, and also oxidising the phosphorus into the pentavalent form by treating the fabric dried out after the first or second treatment with a solution of hydrogen peroxide.

U.S. Pat. No. 4,732,789 proposes a two-stage process of treating fabrics made of a mixture of cotton with polyester or nylon. The fabric is initially treated by the "Proban" method, after which hexabromocyclododecane or cyclic phosphonates are used to provide fire protection for the polyester or nylon components. The treated fabric is vulcanised, and if hexabromocyclododecane is used, it is heated to above 182° C. to melt the fireproofing compound. The two-stage nature of the process and the requirement for vulcanisation at high temperatures makes it very difficult for this invention to be applied in practice.

A preparation called "Pyrofix", based on dialkyl phosphonamide of carbonic acid (Catalogue of Chemical Products, JSC "Ivkhimprom", 1995, pp. 22–23), has been proposed for imparting fire protection properties to textile materials containing cellulose.

To impart fire protection properties, it is recommended that the impregnating solution should contain the following (g/liter):

| | |
|---|---|
| pyrofix | 350–400, |
| metazine 6Y | 60–80, |
| polyethylene emulsion | 20–30, |
| orthophosphoric acid | 10. |

The problem with this preparation is the low efficiency of the fireproofing effect for fabrics made of a mixture of cellulose and synthetic fibres.

USSR Authorship Certificate No. 1427017 describes a fire protection treatment for textile materials using a composition including methyl phosphonic acid diamide, ammonium chloride, carbamide, glycazine or dimethyl polyethylene carbamide and sulfocide-31. The use of this composition makes it possible to obtain fire-protected textile materials made from a mixture of cellulose and synthetic fibres. The problems with this method are: the low hydrolytic stability of the methyl phosphonic acid diamide, and the instability of aqueous solutions containing both methyl phosphonic acid diamide and glycazine (the formation of a oligomer product insoluble in water, which has a low reaction capability relative to the functional groups of polymer materials). Fire-protected textile materials can only be obtained if there is a high content of combustion retarder on the fabric (up to 30% of the weight of the material).

Substance of the Invention Explained

Although there are known and widely used compositions of various kinds serving to reduce the combustibility of textile materials of natural (cotton, flax, wool) and chemical (viscose, cupro-ammonium, polyester, polycaproamide) fibres and mixtures of them in various compositions, the problem of creating new and more effective processes for the fire protection of materials and fire-protective compositions remains urgent. This invention is primarily aimed at solving this problem.

Other aims of the invention are:
to reduce the smoke-forming capability of fire-protected textile materials subjected to pyrolysis and combustion;
to increase the resistance of the fireproofing properties of the material to wet treatments and chemical cleaning;
to impart a range of fire-protection and water-and-oil-repellent properties to textile materials;
to enable these things to be done using simple and reliable equipment existing in the finishing production lines of textile factories.

The invention described below solves these problems.

The first aspect of this invention is the creation of a process for the fire protection treatment of textile materials which includes the following sequence of operations:
impregnation of the material with an aqueous solution of a melamine-type (melamine-formaldehyde) resin;
the drying of the material;
impregnation of the material with an aqueous solution containing carbamide and a complex compound of the ammonium salt of amidoalkylphosphonic acid with ammonium chloride, Formula

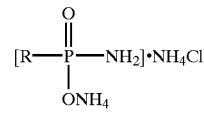

where R is an alkyl radical with 1–3 carbon atoms;
the drying of the material and its heat treatment at a temperature of 140–170 C.

In addition to the operations listed above, the material may also be washed and dried after heat treatment.

Compounds containing silicon may be used instead of melamine-type resin for impregnating the material at the first stage of the fire protection process. Furthermore, these substances (melamine-type resin and silicon-containing compounds) may be used together.

Silicon-containing compounds, like melamine-type resin, are used in the textile industry as auxiliary substances at the final stage of finishing textile materials of various compositions. The presence of functionally active groups in the melamine-type resins and silicon-containing compounds makes it possible for them to interact both with the functional groups of the phosphorus-containing combustion retarder and with the functional groups of the macromolecules of the polymers in polycondensation reactions. The course of these reactions leads to a higher degree of fixation of the combustion retarder on the fabric and to greater resistance of the fireproofing effect to wet treatments and chemical cleaning. The combined use of melamine-type resins and silicon-containing compounds improves the feel of the fabric and its resistance to wear.

Another aspect of the invention is the creation of a composition for the fire-protection treatment of textile materials, which consists of an aqueous solution of carbamide and a complex compound of the ammonium salt of amidoalkylphosphonic acid with ammonium chloride as in Formula (I).

The advisable concentration of these components per liter of aqueous solution comprises:

| | |
|---|---|
| complex compound, Formula (I) | 200–350 g/liter; |
| carbamide | 20–40 g/liter. |

To reduce the smoke-forming capability of the protected materials, it is advisable to add anion complexes of metals, in particular W, Zr and Ti, in a concentration of 2–10 g/liter.

To impart a range of fire-protection and water and oil repulsion properties to the materials, it is advisable to introduce latexes containing fluorine into the fireproofing composition in a concentration of 30–50 g/liter.

Furthermore, organosilicon substances may be introduced into the fireproofing composition as a water repellent.

The patent protection also extends to textile materials of natural fibres (cotton, flax, wool), of chemical fibres (in particular viscose, cupro-ammonium, polyester and polycaproamide) and mixtures of them of various compositions, if they are subjected to fireproofing treatment in accordance with this invention.

The invention is further illustrated by examples of its implementation.

EXAMPLE NO. 1

A cotton fabric is impregnated with an aqueous solution of metazine 20 g/liter, dried, impregnated with an aqueous solution of a complex compound of the ammonium salt of amidoalkylphosphonic acid with ammonium chloride (AAPC for short) 300 g/liter and carbamide 30 g/liter, dried, heat treated at 150° C. for five min., washed with water and dried. The modified fabric had an AI of 32.5%, no residual combustion time. (AI=Acid Index, i.e. the minimum content of acid in a mixture with nitrogen, for which stable combustion of the specimen takes place: GOST 12.1.044-89).

EXAMPLE NO. 2

A fabric composed of a mixture of cotton yarn and polyester fibre (fibre ratio 67:33%) is impregnated with an aqueous solution of glycazine 30 g/liter, dried, impregnated with an aqueous solution of AAPC 300 g/liter and carbamide 40 g/liter, dried, heat-treated at 160° C. for five min., washed with water and dried. AI=31.9%, no residual combustion time.

EXAMPLE NO. 3

A fabric composed of a mixture of cotton yarn and polyester fibre (fibre ratio 67:33%) is treated in accordance with Example No. 2, but for the second impregnation (aqueous solution of AAPC and carbamide), a water-repellent liquid containing silicon (GKZh-10) is also introduced in quantity 30 g/liter. AI=32.3%.

EXAMPLE NO. 4

A fabric composed of a mixture of viscose and polyester fibres (fibre ration 50:50%) is impregnated with an aqueous solution of glycazine 30 g/liter, dried, impregnated with an aqueous solution of AAPC 350 g/liter and carbamide 40 g/liter, dried, heat-treated at 165° C. for five min., washed with water and dried. AI=30.1%.

EXAMPLE NO. 5

A fabric composed of a mixture of viscose and polyester fibres (fibre ratio 50:50%) is treated in accordance with example No. 4, but during the second impregnation, the water repellent aminopropyl triethoxysilane (mark AGM-9) is also added in quantity 50 g/liter. AI=32.0%.

EXAMPLE NO. 6

A fabric composed of a mixture of viscose fibre (20%), cotton (51%) and nitron (29%) is treated with an aqueous solution of glycazine 30 g/liter, dried, impregnated with an aqueous solution of AAPC 350 g/liter and carbamide 40 g/liter, dried, heat-treated at 160° C. for seven min., washed with water and dried. AI=33%.

EXAMPLE NO. 7

A fabric composed of a mixture of cotton (62%), polycaproamide (18%) and acetate (20%) is treated in accordance with Example No. 6. AI=30.6%.

EXAMPLE NO. 8

A fabric composed of a mixture of wool (54% and cotton (46%) is treated with an aqueous solution of glycazine 30 g/liter, dried, impregnated with a solution of AAPC 250 g/liter and carbamide 40 g/liter with the addition of potassium hexafluorotitanate 10 g/liter, dried, heat-treated at 165° C. for five min., washed with water and dried. AI=36.2%.

EXAMPLE NO. 9

A fabric composed of a mixture of cupro-ammonium fibre (59%), wool (36%) and caprone (5%) is treated in accordance with Example No. 8. AI=32.8%.

EXAMPLE NO. 10

A fabric composed of a mixture of cotton (57%), flax (29%) and polyester fibre (14%) is treated in accordance with example No. 5. AI=34.5%.

EXAMPLE NO. 11

A polyester fabric is impregnated with an aqueous solution of glycazine 20 g/liter and aminopropyl triethoxysilane 40 g/liter, dried, impregnated with an aqueous solution of AAPC 350 g/liter and carbamide 40 g/liter, dried, heat-fixed at 170° C. for 10 min., washed and dried. AI=29.1%.

EXAMPLE NO. 12

A polyester fabric is impregnated with an aqueous solution of aminopropyl triethoxysilane 50 g/liter, dried, impregnated with an aqueous solution of AAPC 350 g/liter and carbamide 35 g/liter, dried, heat-treated at 170° C. for 10 min., washed and dried. AI=28.0%.

EXAMPLE NO. 13

A polyester fabric is impregnated with an aqueous solution of glycazine 20 g/liter, dried, impregnated with an aqueous solution of AAPC 350 g/liter, carbamide 30 g/liter and water-repellent organosilicon liquid (GKZh-10) 40 g/liter, dried, heat-treated at 165° C. for 10 min., washed and dried. AI=30.0%.

EXAMPLE NO. 14

A cotton fabric is impregnated with an aqueous solution of metazine 20 g/liter, dried, impregnated with an aqueous solution of AAPC 300 g/liter, carbamide 30 g/liter and perfluoroheptylacrylate 40 g/liter, dried, heat-treated at 150° C. for five min., washed with water and dried. The modified fabric had AI 33.7% and water resistance 160 mm of water column.

EXAMPLE NO. 15

A fabric composed of a mixture of cotton yarn and polyester fibre (ratio 67:33%) is treated in accordance with example No. 2, but perfluoroheptylacrylate is also introduced into the AAPC and carbamide solution in quantity 30 g/liter. AI=33.4%, water resistance 190 mm of water column.

EXAMPLE NO. 16

A fabric composed of a mixture of cotton yarn and polyester fibre (ratio 50:50%) is impregnated with an aqueous solution of glycazine 20 g/liter, dried, impregnated with an aqueous solution of AAPC 300 g/liter, carbamide 30 g/liter and perfluoroalkylacrylate 40 g/liter, dried, heat-treated at 160° C. for 10 min. and washed. AI=29.0%, water resistance 200 mm of water column.

The advantages of the proposed invention by comparison with the known compositions are confirmed by the data on the efficiency of the fire protection effect for various fabrics given in Table 1.

TABLE 1

| Composition for fireproofing treatment | Composition of fabric, % | | Content of combustion Retarder in fabric, % | Residual combustion time, % | AI, % |
|---|---|---|---|---|---|
| | Cotton | Poly-ester | | | |
| "Proban" | 100 | — | 12 | 0 | 31.8 |
| | 80 | 20 | 10 | 15 | 27.6 |
| | 67 | 33 | 11 | Burns up completely | 25.7 |
| | 50 | 50 | 12 | Burns up completely | 23.8 |
| | — | 100 | 11 | Burns up completely | 22.7 |
| "Pyrovatex-CP" | 100 | — | 16 | 0 | 31.7 |
| | 80 | 20 | 15 | 13 | 27.6 |
| | 67 | 33 | 14 | burns up completely | 25.2 |
| | 50 | 50 | 14 | burns up completely | 23.3 |
| | — | 100 | 16 | burns up completely | 22.0 |
| Proposed composition | 100 | 0 | 14 | 0 | 32.5 |
| | 80 | 20 | 15 | 0 | 32.0 |
| | 67 | 33 | 16 | 0 | 31.9 |
| | 50 | 50 | 15 | 0 | 30.0 |
| | — | 100 | 13 | 0 | 29.1 |

It follows from the data in Table 1 that for the treatment of fabrics composed of a mixture of cellulose and polyester fibres with content of the synthetic component more than 20%, fireproofed materials were not produced using the compositions "Proban" and "Pyrovatex-CP" (AI<27%). Fabrics of this composition treated by the proposed process are characterised by quite high AI values for content of combustion retarder on the fabric of not more than 16%. There is no residual combustion time after the removal of the source of ignition.

What is claimed is:

1. Process for fire protection treatment of a textile material, wherein the process includes the following sequence of operations:
   impregnation of a textile material with an aqueous solution of melamine-formaldehyde resin;
   drying of the material impregnated with this solution;
   impregnation of the material with an aqueous solution containing carbamide and a complex compound of the ammonium salt of amidoalkylphosphonic acid with ammonium chloride of the following formula:

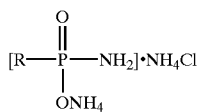

where R is an alkyl radical with 1–3 carbon atoms;
   drying of the material; and
   heat treatment of the material at a temperature of approximately 140°–170° C.

2. Process in accordance with claim 1, wherein after the said heat treatment, the material is washed and dried.

3. Process in accordance with claim 1, wherein a silicon-containing compound is added to the aqueous solution of melamine-formaldehyde resin.

4. Process in accordance with claim 3, wherein the said aqueous solution contains 20–30 g/liter of melamine-formaldehyde resin and 30–50 g/liter of silicon-containing compound.

5. Process in accordance with claim 1, wherein anion complexes of metals are added to the aqueous solution of carbamide and the complex compound.

6. Process in accordance with claim 1, wherein latexes containing fluorine are introduced into the aqueous solution of carbamide and the complex compound.

7. Process in accordance with claim 1, wherein a textile material composed of natural fibres is subjected to the treatment.

8. Process in accordance with claim 1, wherein a textile material composed of synthetic fibres is subjected to the treatment.

9. Process in accordance with claim 1, wherein a textile material composed of mixtures of natural and synthetic fibres is subjected to the treatment.

10. A textile material composed of natural and synthetic fibres and mixtures of them, subjected to fireproofing treatment in accordance with claim 1.

11. A process for fire protection treatment of a textile material, wherein the process includes the following sequence of operations:
    impregnation of a textile material with an aqueous solution of silicon-containing compound;
    drying of the material impregnated with this solution;
    impregnation of the material with an aqueous solution containing carbamide and a complex compound of the ammonium salt of amidoalkylphosphonic acid with ammonium chloride of the following formula:

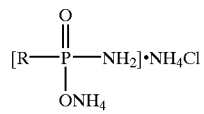

where R is an alkyl radical with 1–3 carbon atoms;
    drying of the material; and
    heat treatment of the material at a temperature of approximately 140°–170° C.

12. Process in accordance with claim 11, wherein after the said heat treatment, the material is washed and dried.

13. Process in accordance with claim 11, wherein anion complexes of metals are added to the aqueous solution of carbamide and the complex compound.

14. Process in accordance with claim 11, wherein latexes containing fluorine are added to the aqueous solution of carbamide and the complex compound.

15. in accordance with claim 11, wherein a textile material composed of synthetic fibres is subjected to the treatment.

16. Process in accordance with claim 11, wherein a textile material composed of mixtures of natural and synthetic fibres is subjected to the treatment.

17. A textile material composed of natural and synthetic fibres and mixtures of them subjected to fireproofing treatment in accordance with claim 11.

18. Composition for fire protection treatment of a textile material wherein the composition consists of an aqueous solution containing carbamide and a complex compound of the ammonium salt of amidoalkylphosphonic acid with ammonium chloride of the following formula:

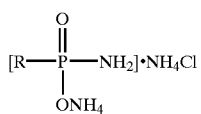

where R is an alkyl radical with 1–3 carbon atoms.

19. Composition in accordance with claim 18, wherein the composition contains (g/liter):

| | |
|---|---|
| the complex compound | 200–350 |
| carbamide | 20–40 |
| water | the remainder. |

20. Composition in accordance with claim 18, wherein the composition contains anion complexes of metals in quantity 2–10 g/liter.

21. Composition in accordance with claim 20, wherein the anion complexes of metals are selected from the group consisting of W, Zr and Ti.

22. Composition in accordance with claim 18, wherein the composition also includes latexes containing fluorine in quantity 30–50 g/liter.

23. Composition in accordance with claim 18, wherein the composition includes a water repellent.

24. Composition in accordance with claim 23, wherein the water repellent is an organosilicon substance.

25. A textile material composed of natural and synthetic fibres treated with a fireproofing composition in accordance with claim 18.

* * * * *